(12) United States Patent
Morovic et al.

(10) Patent No.: US 9,756,221 B2
(45) Date of Patent: Sep. 5, 2017

(54) RGB TO NPAC-RELATED SPACE TRANSLATION

(71) Applicant: Hewlett-Packard Development Company, L.P., Houston, TX (US)

(72) Inventors: Peter Morovic, Sant Cugat del Valles (ES); Martí Rius Rossell, Sant Cugat del Valles (ES); Jan Morovic, Colchester (GB); Juan Manuel García Reyero Viñas, Sant Cugat del Valles (ES)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 14/763,507

(22) PCT Filed: Jan. 29, 2013

(86) PCT No.: PCT/EP2013/051612
§ 371 (c)(1),
(2) Date: Jul. 25, 2015

(87) PCT Pub. No.: WO2014/117802
PCT Pub. Date: Aug. 7, 2014

(65) Prior Publication Data
US 2016/0080608 A1 Mar. 17, 2016

(51) Int. Cl.
*H04N 1/00* (2006.01)
*H04N 1/60* (2006.01)
*G06K 15/02* (2006.01)

(52) U.S. Cl.
CPC .......... *H04N 1/6025* (2013.01); *G06K 15/02* (2013.01); *G06K 15/027* (2013.01); *G06K 15/1878* (2013.01); *H04N 1/00015* (2013.01); *H04N 1/00023* (2013.01); *H04N 1/00034* (2013.01); *H04N 1/00045* (2013.01); *H04N 1/00082* (2013.01); *H04N 1/6016* (2013.01); *H04N 1/6033* (2013.01); *H04N 1/6061* (2013.01)

(58) Field of Classification Search
None
See application file for complete search history.

(56) References Cited

U.S. PATENT DOCUMENTS

| 5,204,665 A | 4/1993 | Bollman et al. |
| 5,606,632 A | 2/1997 | Matsumoto et al. |
| 6,480,299 B1 | 11/2002 | Drakopoulos et al. |
| 6,930,691 B2 | 8/2005 | Lebowsky et al. |
| 7,411,701 B2 | 8/2008 | Boll |

(Continued)

OTHER PUBLICATIONS

International Search Report, European Patent Office, Oct. 2, 2013, PCT Patent Application No. PCT/EP2013/051612, 4 pages.

(Continued)

*Primary Examiner* — Scott A Rogers
(74) *Attorney, Agent, or Firm* — HP Inc.—Patent Department (57) ABSTRACT

A method of defining color separation for printing an image via NPacs, the method comprising: selecting a plurality of NPacs corresponding to a plurality of points within an RGB cube to provide a tessellation in RGB space translated to a valid tessellation in an NPac-related space; and defining color separation from the selected NPacs.

13 Claims, 5 Drawing Sheets

(56) References Cited

U.S. PATENT DOCUMENTS

| | | | |
|---|---|---|---|
| 8,363,273 B2* | 1/2013 | Morovic | H04N 1/6033 358/1.15 |
| 8,670,167 B2* | 3/2014 | Benedicto | H04N 1/6058 358/1.9 |
| 9,584,700 B2* | 2/2017 | Morovic | H04N 1/52 |
| 2005/0000378 A1 | 1/2005 | Zurcher | |
| 2006/0232803 A1* | 10/2006 | Hori | H04N 1/6058 358/1.9 |
| 2007/0285435 A1* | 12/2007 | Falk | G06F 3/13 345/600 |
| 2010/0214576 A1 | 8/2010 | Morovic et al. | |
| 2011/0096344 A1* | 4/2011 | Morovic | H04N 1/6033 358/1.9 |
| 2011/0096364 A1* | 4/2011 | Morovic | H04N 1/52 358/3.06 |
| 2011/0096365 A1 | 4/2011 | Benedicto et al. | |
| 2014/0016143 A1* | 1/2014 | Morovic | H04N 1/6016 358/1.9 |
| 2016/0080612 A1* | 3/2016 | Martinez de Salinas Vazquez | H04N 1/6019 358/3.06 |
| 2017/0048420 A1* | 2/2017 | Morovic | G01J 3/46 |
| 2017/0064145 A1* | 3/2017 | Morovic | H04N 1/52 |
| 2017/0126931 A1* | 5/2017 | Morovic | H04N 1/405 |

OTHER PUBLICATIONS

Morovic, Jan, et al. "HANS: Controlling Ink-Jet Print Attributes Via Neugebauer Primary Area Coverages" IEEE Transactions on Image Processing, IEEE Service Center, Piscataway, NJ, US, vol. 21, No. 2, Feb. 1, 2012, pp. 688-696.

Ni, Jian, et al. "Coloring spatial point processes with applications to peer discovery in large wireless networks." ACM SIGMETRICS Performance Evaluation, pp. 575-588.

* cited by examiner

RGB TO NPAC-RELATED SPACE TRANSLATION

CROSS-REFERENCE TO RELATED APPLICATION

This application is a U.S. National Stage Application of and claims priority to International Patent Application No. PCT/EP2013/051612, filed on Jan. 29, 2013, and entitled "COLOR SEPARATION," which is hereby incorporated by reference in its entirety.

BACKGROUND

One technique for reproducing a desired target color using a printing system is a color separation process. Color separation has traditionally been a matter of deciding what quantities of each of several inks (or other colorants) to use to achieve a given color. Setting up an end-to-end color pipeline involves defining a color separation, a device color interface (typically RGB or CMYK), building an ICC profile on top of this interface and a mechanism to calibrate these resources to a nominal, reference state is complex and time consuming.

BRIEF DESCRIPTION OF DRAWINGS

For a more complete understanding, reference is now made to the following description taken in conjunction with the accompanying drawings in which.

DETAILED DESCRIPTION

This process may utilize look-up tables comprising colorimetric input values or input values in a device color space. The output values for the tables may be n-dimensional ink vectors, where n is the number of inks used by the printer and the vector components representing quantities of each ink.

However, controlling print color by variation of ink amounts is a highly non-linear process, deriving from a complex relationship between changes in the quantity of each ink color used and the color of the resulting printed ink combination. As a result of this non-linearity, the gamut (the set of all printable colors) of a printing device may also include concavities when plotted in a three dimensional color space. These concavities in some cases result in only relatively dull dark colors being printable. In addition, small changes in a system comprising non-linear relationships may also result in unacceptably large changes in output color.

One technique chooses Neugebauer Primary area coverage (NPac) vector, including up to all of an ink set's $k^n$ Neugebauer primaries (NPs), followed by a halftoning process to generate the corresponding halftone patterns based upon the Neugebauer Primary area coverages. In one implementation, the Neugebauer Primaries are all the possible combinations of a set of n inks.

Each ink within the set may be at one of k levels for a single halftone pixel, where there are $k^n$ combinations for each ink set defining all of the possible ink configuration states that a single pixel can have. For example, where k=2 for a binary (or bi-level) printer, the printer is able to use either no ink or one drop of ink at a single pixel per ink channel. Given that NPacs represent linear, convex combinations of NPs (with relative area coverages being the convex weights), and as all of a printing system's NPacs are accessible, all colors inside the convex hull of a printing system's Neugebauer primaries' colors can be addressed.

Setting up an end-to-end color pipeline, which involves defining a color separation, a device color interface (typically RGB or CMYK), building an ICC profile on top of this interface and a mechanism to calibrate these resources to a nominal, reference state, is complex and the amount of printing and measuring involved in this process typically depend on the number of inks used in the system (the more inks, the more patches are needed). While building an ICC profile typically involves 100s of patches for accurate performance. The measurements are then used to build resources applied on-line, such as Colormaps (ND LUTs of $17^3$ size), ICC profiles (3 or 4D LUTs of $17^3$ size) and calibration tables (N 1D tables). Both colormaps and profiles are nontrivial to build and require sophisticated algorithms to map each stage to the subsequent one. The use of these resources then warrants access to the full color gamut and accuracy across the volume as well as smoothness of transitions, however it is both lengthy, computationally expensive and interdependent (the goodness of a device interface influences the performance of a profile etc). As a result, a complex multistep process is required with a large number of measurements and a large amount of computation to determine the entire pipeline.

The pipeline which is set up by the process of the example below is based on the HANS approach of defining color via Neugebauer Primary Area Coverages (NPacs) that results in a convex, linear relationship in an area coverage linear space such as a Yule-Nielsen transformed CIE XYZ colorimetry.

Figure 1:
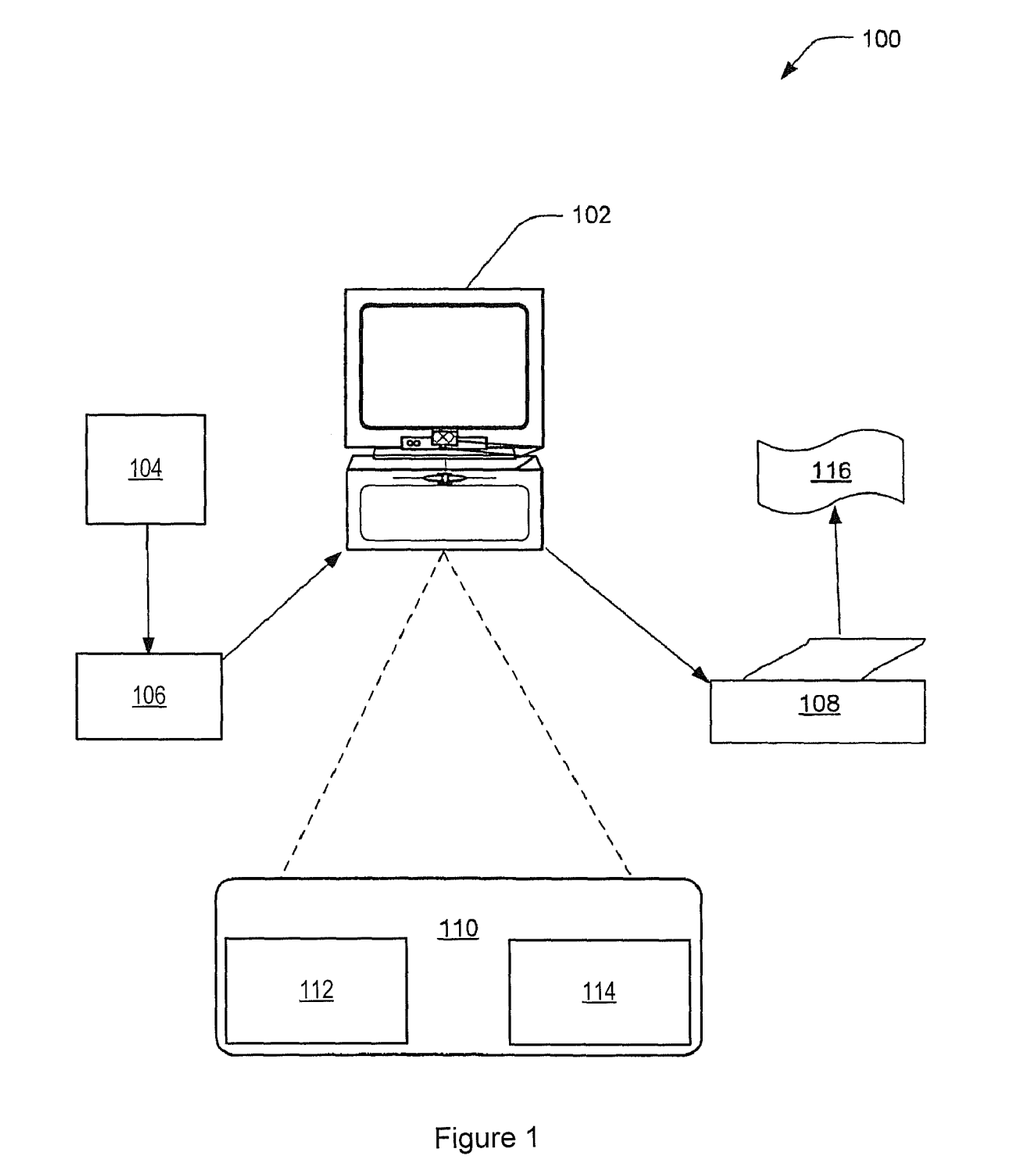
FIG. 1 is a simplified schematic of an example of a printing system.

FIG. 1 illustrates an example of a printing system and image processing 100. The printing system 100 may be implemented, at least in part, by one or more suitable computing devices, such as computing device 102. Other computing devices that may be used include, but are not limited to, a personal computer, a laptop computer, a desktop computer, a digital camera, a personal digital assistance device, a cellular phone, a video player, and other types of image sources.

In one implementation, an image 104 is uploaded to the computing device 102 using input device 106. In other implementations, the image may be retrieved from a previously generated image set contained on a storage media, or retrieved from a remote storage location, such as an online application, using the Internet. Image 104 may be a still digital image created by a digital camera, a scanner, or the like. In other implementations the image may be a moving image such as a digital video. Image 104 may be sent to an output device such as printing device 108 by the computing device 102. Other printing devices that may be used include, but are not limited to, a dot-matrix printer, an inkjet printer, a laser printer, line printer, a solid ink printer, and a digital printer. In other implementations, the image may be displayed to a user on an output device 108 including, but not limited to, a TV set of various technologies (Cathode Ray Tube, Liquid Crystal Display, plasma), a computer display, a mobile phone display, a video projector, a multicolor Light Emitting Diode display, and the like.

In one implementation, printing system 100 employs a printing interface and image processing system 110 referred to as Halftone Area Neugebauer Separation (HANS). HANS may be executed using computing device 102. However, in other implementations, HANS may be executed using the printing device 108.

HANS changes the space in which a color separation process 112 and a halftoning process 114 communicate. In one example of a separation performed using HANS, the channels connecting the color separation process and the halftoning process communicate using aspects associated with Neugebauer Primary Area Coverage (NPac). In one implementation, the NPacs utilize a set of equations referred to as the Neugebauer equations. Neugebauer equations are tools for characterizing color printing systems based upon halftoning techniques. The Neugebauer equations, are associated with colors referred to as the Neugebauer Primaries, which in a binary (bi-level) printing device, are the $2^n$ combination of n inks and their overprints, wherein the application of each of the n inks is at either 0% or 100%. Generally, the number of Neugebauer Primaries (NPs) is $k^n$, where k is the number of levels at which an ink can be used and n is the number of inks. For example, for a printer comprising six different inks and either 0, 1, or 2 drops of each ink may be specified at each halftone pixel, resulting in $3^6$ or 729 Neugebauer Primaries (NPs).

The printing device 108 will direct the image 104 to be printed upon a substrate 116 as dictated by the HANS printing process. The substrate 116 may include, without limitation, any variety of paper (lightweight, heavyweight, coated, uncoated, paperboard, cardboard, etc.), films, foils, textiles, fabrics, or plastics.

It should be noted that while printing system 100 is described in the context of image processing in a computing environment, it is to be appreciated and understood that it can be employed in other contexts and environments involving other types of data processing.

Color printing is the reproduction of an image or text in color on substrate 116. A technique which may be used to print full-color images, such as photographs, is a four-color process printing. In one implementation, a technique which may be employed in the color printing process includes an additive color model. An example additive process is a model such as red, green, blue, (RGB). An additive process involves the light emitted directly from a source. Furthermore, the additive process combines the primary colors RGB to produce secondary primary colors cyan, magenta and yellow.

As discussed above, the printing interface 110 implements two main processes, the first of which is color separation. Color separation involves representing a color image as a combination of several single-color images corresponding to available ink colors, or printable elementary colors, in a printing system. In one example, the color image is represented as a combination of one or more single-color layers. These single color layers may include, but are not limited to, a red layer, a green layer, and a blue layer.

Figure 2:
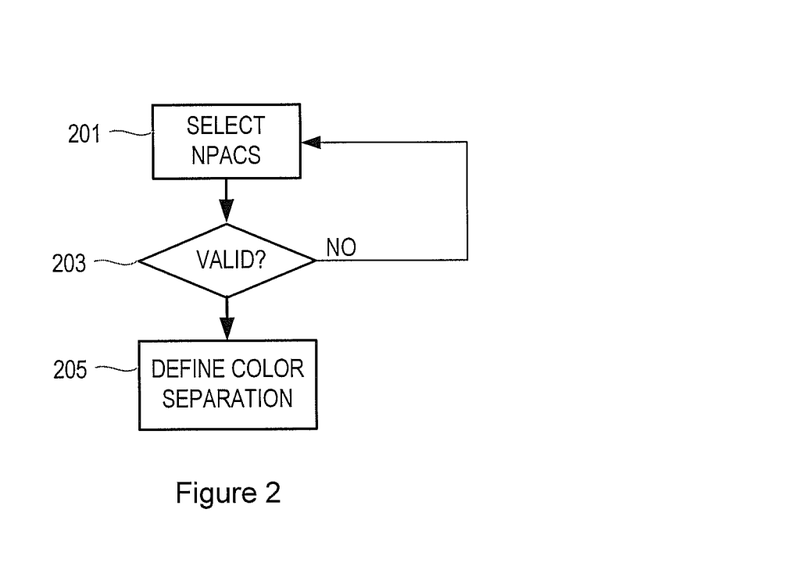
FIG. 2 is a flowchart of an example of a method of defining color separation for printing.

In an implementation, the color separation for printing an image via NPacs is defined in a one-off off-line process. The process may be repeated as required to recalibrate the printer system. With reference to FIG. 2, the color separation is defined, 205, from a selected number of NPacs. The plurality of NPacs are each selected, 201, corresponding to a point within an RGB cube to provide a tessellation in RGB space translated to a valid tessellation in an NPac-related space (for example a Yule-Nielsen transformed XYZ space), 203.

This enables a printer colour pipeline to be defined with a greatly reduced number of NPacs, for example, but not limited to 8 NPac vertices and that these are selected (in whatever way) so that they correspond and represent the RGB cube's 8 vertices and that a tessellation in RGB space translates to a valid tessellation (i.e. without irregularities such as inverted tessela) in NPac-related space (e.g. Yule-Nielsen transformed XYZ space).

A tessellation is a collection of polytopes (e.g., polygons in two dimensions, polyhedra in three dimensions) that fill the convex hull of the color gamut with no overlaps or gaps. In one implementation, the tessellation is performed using the Delaunay Tessellation technique. In other implementations, other tessellation techniques may be used. As discussed above, because the NPs can be combined convexly and relate to colorimetry in a linear color space, the tessellation technique may be any geometric tessellation technique.

Figure 3:
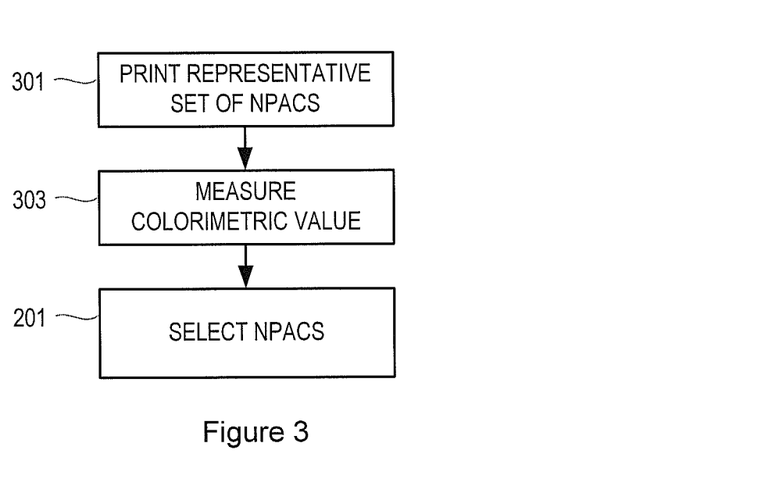
FIG. 3 is a flowchart of more detail of the example of a method of defining color separation for printing.
Figure 4:
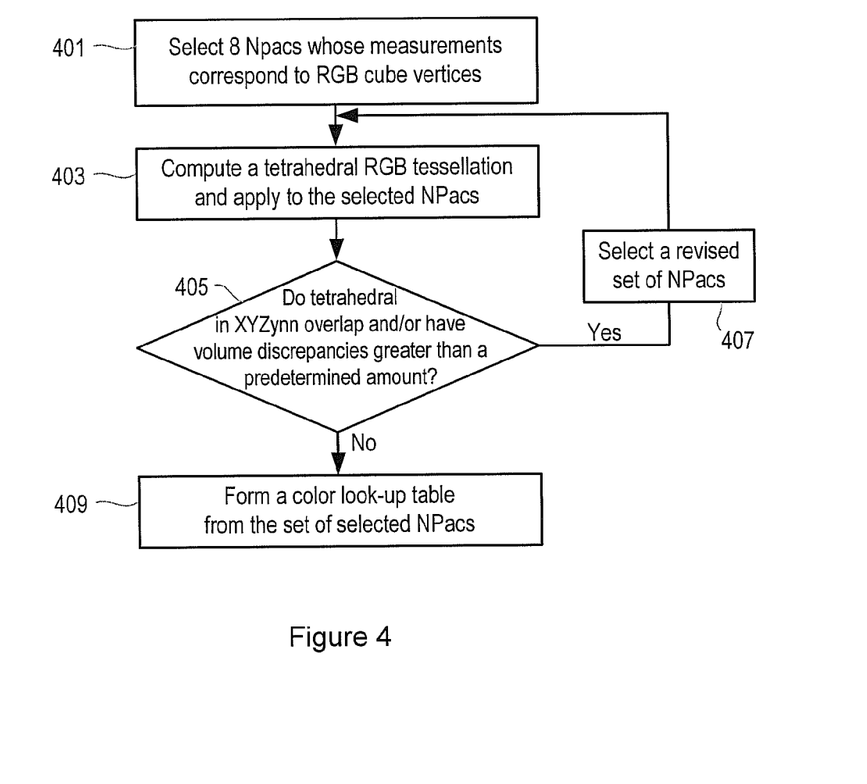
FIG. 4 is a flowchart of more detail of the example of a method of defining color separation for printing.
Figure 5A:
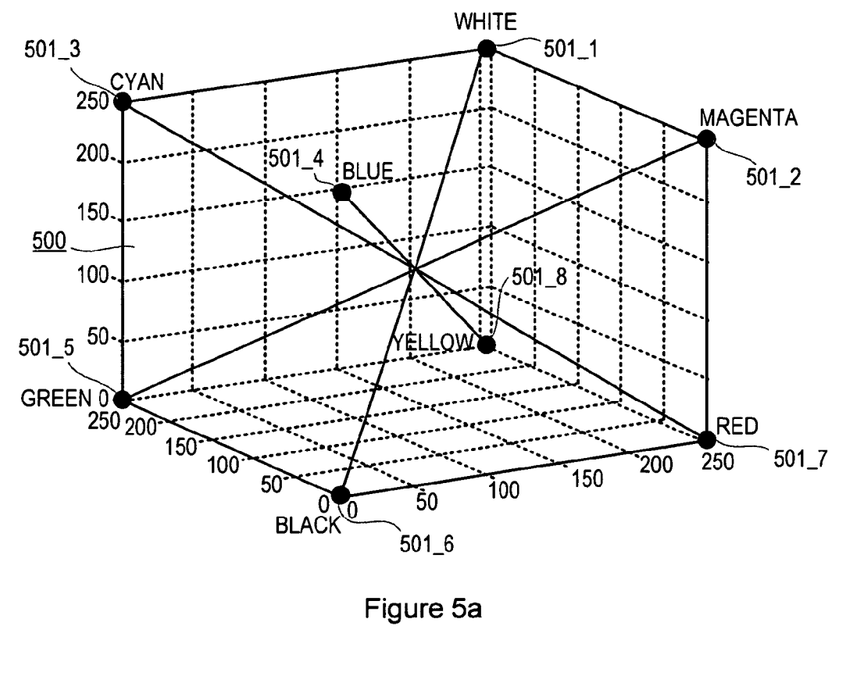
FIG. 5a is an illustration of an RGB cube.
Figure 5B:
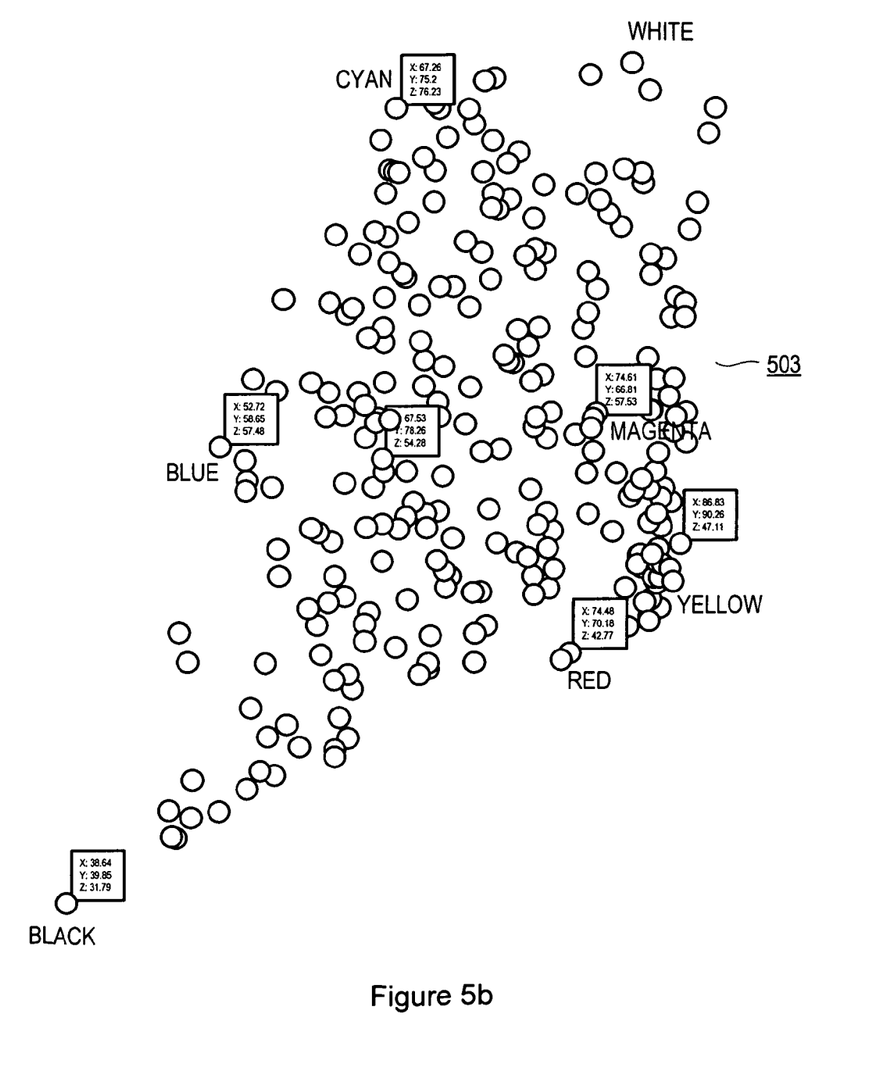
FIG. 5b is an illustration of print of NPacs.

The NPacs that are used to define the color separation for the printer color pipeline may be designed from scratch. Alternatively, as illustrated in FIG. 3, this selection may be achieved by printing, 301 a representative set of NPacs for the printing system on a print medium. These may be a set of all Neugebauer Primaries (device's ink-drop states, e.g. primaries, secondaries, tertiaries etc. . . . ) after ink limiting (the within-ink-limit samples are printed at 100% area coverage, while the above-ink-limit ones are gamut-mapped to the ink-limit by combining them with other NPs, including blank media). Next, the colorimetric value of the printed NPacs is measured, 303, for example, by a spectrophotometer (or colorimeter) that returns reflectance from which CIE XYZ colorimetry is computed or the CIE XYZ colorimetry is output directly. The resulting XYZ measurements are transformed to an area coverage linear space such as a Yule-Nielsen transformed domain where CIE XYZs are raised to the power of (1/YNN) where YNN is the Yule-Nielsen factor 503 and are represented in FIG. 5b. The plurality of NPacs are selected from the printed representative set of NPacs based on the measured colorimetric value. A set Neugebauer Primaries-representative NPacs may be printed or a representative subset may be printed. The NPacs may be selected to simply correspond to the 8 vertices 501_1 to 501_8 of the RGB cube 500, shown in FIG. 5a, manually or algorithmically (as shown in FIG. 4). This may be done once and off-line to select the points (e.g. vertices) that satisfy the constraint of the RGB tessellation being a valid one in the NPac-related space ($XYZ^{(1/YNN)}$ space).

8 NPacs may be selected, corresponding to vertices 501_1 to 501_8 of the RGB cube 500. Alternatively, any number of NPacs corresponding to any points within the RGB cube may be selected. For example, additional NPacs may be selected corresponding to points in the vicinity of the "Black" vertices 501_6 to provide more detail near black, or, alternatively, 5 points (W-RG-RB-GB-K) may be selected (at least 4 NPacs) each corresponding to a point within the RGB cube or corresponding to a point substantially in the vicinity of any of the vertices 501_1 to 501_8 of the RGB cube 500.

As illustrated in FIG. 4, the NPacs may be selected algorithmically. In this example, 8 NPacs are selected such that a tetrahedron in the NPac-related color space mapped to the corresponding tetrahedron of the RGB cube avoid overlap with the vertices not connected by the tetrahedron of the RGB cube. This may be achieved by selecting, 401, an initial set of eight of a representative set of NPacs corresponding to the vertices of an RGB cube; computing, 403, a tetrahedral RGB tessellation and mapping the tetrahedral tessellation to the initial set of NPacs in the NPac-related space; determining, 405, whether any of the tetrahedral in the NPac-related space overlap and/or have volume discrepancies greater than a predetermined amount. In the event that any of the tetrahedral in the NPac-related space overlap and/or have volume discrepancies greater than a predetermined amount, selecting, 407, a revised set of eight of the representative set of NPacs corresponding to the vertices of an RGB cube, and repeating steps 403, 405 until a set of eight of the NPacs result in none of the tetrahedral in the NPac-related space overlapping and none of the tetrahedral having volume discrepancies greater than the predetermined amount. The Color Look-Up Table of the color separation is then set up, 409, based on the selected NPacs.

The measurements 503 illustrated in FIG. 5b represent the full color gamut of the device. From within these points a subset of NPacs is selected. These may correspond directly to the extreme vertices 501_1 to 501_8 of an RGB cube 500 respecting the correspondence in geometry: a tetrahedron in $XYZ^{(1/YNN)}$ that connects blue, cyan, magenta and black, should map to the tetrahedron this corresponds to on the RGB cube in order to avoid overlaps with the rest of the vertices. This can be done manually (choosing based on the $XYZ^{(1/YNN)}$ colorimetries with the above constraint) or algorithmically, such as: selecting pairs of NPacs corresponding to colors on opposite vertices of the RGB cube such that the angles between axes connecting the pairs of NPacs are maximised. For example, select the darkest NPac as the black vertex of the RGB cube and select the lightest NPac, which can often be the NP of blank substrate (i.e. 100% area coverage of no ink), as the white vertex of the RGB cube. Then, sequentially, select pairs of NPacs corresponding to "opposite colors" on opposite vertices of the RGB cube such as "Blue" 501_4 and "Yellow" 501_8 ("Red" 501_6-"Green" 501_5 and "Cyan" 501_3-"Magenta" 501_2) and select $XYZ^{(1/YNN)}$ measurements that are far from each other and/or the axis connecting the pairs of NPacs is substantially perpendicular to the axis connecting the NPacs selected for the black and white vertices as well as maximise angles between the other opposite color axes.

The selected NPacs are utilised to form Color Look-Up Table, LUT which is used in the color separation module 112 of the printing interface 110 to print the image 104.

To calibrate or recalibrate the printer 108, the selected NPacs identified above are printed onto a print medium and their colorimetric value is measured and the Color Look-Up Table, LUT, is then formed, or reformed, from the measurements of the printed NPacs. This data can be used to map to reference measurements of the NPacs for consistency (calibration) or directly as-is as a color profile.

Giving up the requirement of accessing the full gamut we can then follow these steps to define 8 NPacs that are necessary and sufficient to define an RGB interface, characterize a large sub-volume of the actual device's gamut and constitute the only patches that need to be printed and measured in order to re-calibrate as well as re-profile the pipeline. The result is then an 8 node Color Look-Up Table (or any m node Color Look-Up Table, depending on the number of NPacs selected that is all that is needed to print. The nodes are then tessellated with a neutral-axis-preserving tetrahedral tessellation. Source color content is gamut mapped with a minimum-LAB gamut mapping that has two stages, first mapping source LAB values to the convex hull of the 8-node gamut in LAB space, followed by the gamut mapped LAB converted to Yule-Nielsen XYZ ($XYZ^{(1/YNN)}$) where again if this is outside the $XYZ^{(1/YNN)}$ convex hull, another closest-point mapping occurs.

Once these 8 vertices have been selected, they represent the RGB cube via an explicit correspondence. Transitions between the vertices will be smooth, since they correspond to transitions in area coverages. If the device changes over time, it will only be necessary to print the NPacs that correspond to the $XYZ^{(1/YNN)}$ vertices selected at set-up time. Having these measured a fully populated Color Look-Up Table is established either to include a transformation of the newly measured colorimetry to a previously established reference (calibration) or directly as a new ICC profile.

This minimises set-up time/computation due to the "reduced number, m"-patch definition of the pipeline (e.g. 8-patch definition). Smoothness of transitions due to transitioning in area coverage between the 8 vertices is achieved. Convex gamut and linear interface is also achieved. The process can handle all device variability, encoding in a single m-node LUT for entire colormap (separation), calibration and profiling combined. A small footprint e.g. 8-node LUT results and single interpolation within the LUT to apply full pipeline is achieved (instead of computation due to: separation color-map, ICC profile, color calibration).

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. The features of any dependent claim may be combined with the features of any of the independent claims or other dependent claims.

The invention claimed is:

1. A method of defining color separation for printing an image via NPacs, the method comprising:
   printing a representative set of NPacs for the printing system on a print medium;
   measuring the colorimetric value of the printed NPacs;
   selecting a plurality of NPacs each directly corresponding to a point within an RGB cube to provide a direct tessellation in RGB space translated to a valid tessellation in an NPac-related space, wherein selecting the plurality of NPacs comprises selecting from the printed reresentative set of NPacs based on the measured colorimetric value;
   defining color separation from the selected NPacs; and
   printing the image using the defined color separation from the selected NPacs.

2. A method according to claim 1, wherein the step of selecting a plurality of NPacs comprises selecting at least 4 NPacs, each corresponding to a point substantially in the vicinity of a vertex of the RGB cube.

3. A method according to claim 2, wherein the step of selecting at least 4 NPacs comprises selecting an NPac corresponding to each vertex of an RGB cube.

4. A method according to claim 2, wherein the step of selecting a plurality of NPacs comprises selecting an NPac corresponding to each vertex of an RGB cube such that a tetrahedron in the NPac-related color space mapped to the corresponding tetrahedron of the RGB cube avoid overlap with the vertices not connected by the tetrahedron of the RGB cube.

5. A method according to claim 4, wherein the step of selecting an NPac comprises:
   (i) selecting an initial set of eight of a representative set of NPacs corresponding to the vertices of an RGB cube;

(ii) computing a tetrahedral RGB tessellation and mapping the tetrahedral tessellation to the initial set of NPacs in the NPac-related color space;

(iii) determining whether any of the tetrahedra in the NPac-related color space overlap and/or have volume discrepancies greater than a predetermined amount;

(iv) in the event that any of the tetrahedra in the NPac-related space overlap and/or have volume discrepancies greater than a predetermined amount, selecting a revised set of eight of the representative set of NPacs corresponding to the vertices of an RGB cube, and repeating steps (ii)-(iv) until a set of eight of the NPacs result in none of the tetrahedra in the NPac-related space overlapping and none of the tetrahedra having volume discrepancies greater than the predetermined amount.

6. A method as claimed in claim 4, wherein the step of selecting an NPac comprises: selecting pairs of NPacs corresponding to colors on opposite vertices of the RGB cube such that the angles between axes connecting the pairs of NPacs are maximised.

7. A method as claimed in claim 6, wherein the step of selecting an NPac further comprises:
selecting the darkest NPac as the black vertex of the RGB cube;
selecting the lightest NPac as the white vertex of the RGB cube;
selecting pairs of NPacs corresponding to colors on opposite vertices of the RGB cube such that the axis connecting the pairs of NPacs is substantially perpendicular to the axis connecting the NPacs selected for the black and white vertices.

8. A method according to claim 1, wherein the defining color separation from the selected NPacs comprises: forming a Color Look-Up Table, LUT, from the selected NPacs.

9. A method according to claim 1, wherein the NPac-related space comprises the Yule-Nielsen corrected XYZ(1/YNN) space.

10. A printing system comprising:
a printer module for printing an image;
a color separation module, the color separation module comprising a color lookup table defining the color separation for printing an image via NPacs, the color lookup table being populated from a selection of NPacs each selected to directly correspond to a point within an RGB cube to provide a tessellation in RGB space translated to a valid tessellation in an NPac-related space;
wherein the printer module prints an input image by defining each pixel according to the NPac defined by the color lookup table,
wherein the functions of the color separation module are performed by one of a computing device and a printing device, and wherein the selection of NPacs includes a set of 8 NPac vertices corresponding to and representing 8 vertices of the RGB cube.

11. The method of claim 1, wherein selecting the plurality of NPacs comprises selecting a set of 8 NPac vertices corresponding to and representing 8 vertices of the RGB cube.

12. The method of claim 1, wherein the plurality of NPacs selected from the printed representative set of NPacs comprises a portion of the representative set of NPacs, wherein some NPacs of the representative set of NPacs are not selected.

13. A method of defining color separation for printing an image via NPacs, the method comprising:
printing a representative set of NPacs for the printing system on a print medium;
measuring the colorimetric value of the printed NPacs;
selecting a plurality of NPacs from the printed representative set of NPacs based on the measured colorimetric value, each of the selected plurality of NPacs directly corresponding to a point within an RGB cube to provide a tessellation in RGB space translated to a valid tessellation in an NPac-related space, wherein the step of selecting the plurality of NPacs comprises selecting at least 4 NPacs, each corresponding to a point substantially in the vicinity of a vertex of the RGB cube, wherein the step of selecting the plurality of NPacs comprises selecting an NPac corresponding to each vertex of an RGB cube such that a tetrahedron in the NPac-related color space mapped to the corresponding tetrahedron of the RGB cube avoid overlap with the vertices not connected by the tetrahedron of the RGB cube, and wherein the step of selecting an NPac comprises:

(i) selecting an initial set of eight of a representative set of NPacs corresponding to the vertices of an RGB cube;

(ii) computing a tetrahedral RGB tessellation and mapping the tetrahedral tessellation to the initial set of NPacs in the NPac-related color space;

(iii) determining whether any of the tetrahedra in the NPac-related color space overlap and/or have volume discrepancies greater than a predetermined amount;

(iv) in the event that any of the tetrahedra in the NPac-related space overlap and/or have volume discrepancies greater than a predetermined amount, selecting a revised set of eight of the representative set of NPacs corresponding to the vertices of an RGB cube, and repeating steps (ii)-(iv) until a set of eight of the NPacs result in none of the tetrahedra in the NPac-related space overlapping and none of the tetrahedra having volume discrepancies greater than the predetermined amount; and defining color separation from the selected NPacs.

* * * * *

UNITED STATES PATENT AND TRADEMARK OFFICE
CERTIFICATE OF CORRECTION

PATENT NO. : 9,756,221 B2  
APPLICATION NO. : 14/763507  
DATED : September 5, 2017  
INVENTOR(S) : Peter Morovic et al.

Page 1 of 1

It is certified that error appears in the above-identified patent and that said Letters Patent is hereby corrected as shown below:

In the Claims

In Column 6, Line 44, in Claim 1, delete "reresentative" and insert -- representative --, therefor.

In Column 8, Line 16-17 approx., in Claim 13, delete "NPacs;" and insert -- NPacs --, therefor.

Signed and Sealed this  
Twelfth Day of June, 2018

Andrei Iancu  
*Director of the United States Patent and Trademark Office*